United States Patent Office 2,772,281
Patented Nov. 27, 1956

2,772,281

SYNTHESIS OF 4-AMINO-3-ISOXAZOLIDONE AND ITS DERIVATIVES

Frederick W. Holly, Cranford, and Charles H. Stammer, New Brunswick, N. J., assignors to Merck & Co., Inc., Rahway, N. J., a corporation of New Jersey No Drawing. Application December 23, 1954,
Serial No. 477,391

56 Claims. (Cl. 260—307)

This invention relates to novel chemical compounds and particularly to novel compounds useful as intermediates in the synthesis of 4-amino-3-isoxazolidone and its derivatives, and to processes for preparing these intermediates.

It has now been found that 4-amino-3-isoxazolidone compounds can be synthesized by reactions indicated as follows:

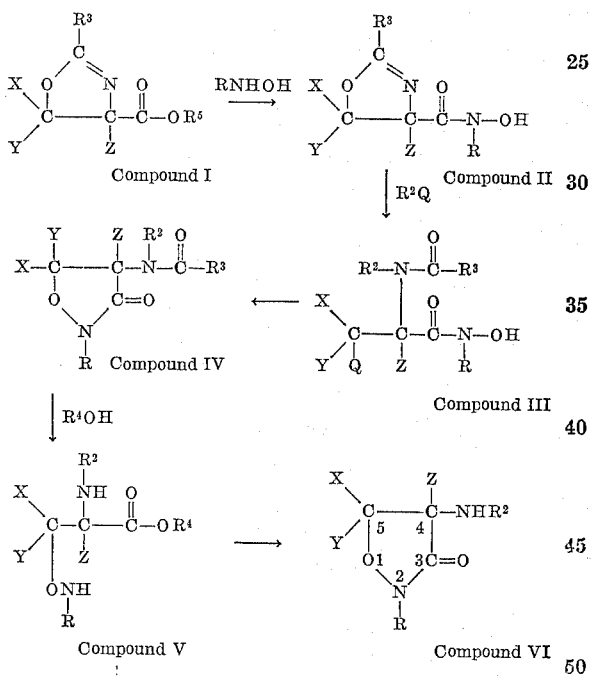

In the above formulae X, Y, and Z are hydrogen or alkyl, aralkyl or aryl groups containing from one to eight carbon atoms and may be the same or different groups; R and $R^2$ are hydrogen or alkyl or aralkyl groups containing from one to eight carbon atoms and may be the same or different groups; $R^3$ is an alkyl, aryl, or aralkyl group containing from one to eight carbon atoms; $R^4$ and $R^5$ are alkyl groups containing from one to eight carbon atoms and may be the same or different groups, and Q is a bromo, chloro, or iodo group.

The reactions indicated are conducted as follows: a 4-carboalkoxy-2-oxazoline compound (Compound I) is reacted with a hydroxylamine in the presence of a base to produce a 4-carbohydroxyamido-2-oxazoline compound (Compound II). This latter compound is then reacted with an ionizable halide compound to form a β-halopropionohydroxamic acid compound (Compound III) which when treated with a base cyclizes to form a 4-amido-3-isoxazolidone compound (Compound IV). This compound is then reacted with an alcohol under acidic conditions to produce an α-amino-β-aminoxypropionate compound (Compound V) which is treated with a base to form a 4-amino-3-isoxazolidone compound (Compound VI).

This invention is concerned with the intermediates 4-carbohydroxyamido-2-oxazoline compound (Compound II) having the general formula:

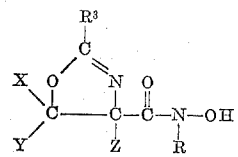

wherein X, Y, Z, R, and $R^3$ are as defined above and β-halopropionohydroxamic acid compound having the formula:

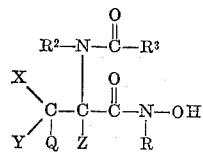

wherein Q, X, Y, Z, R, $R^2$, and $R^3$ are as defined above, and with the process of preparing the 4-amido-3-isoxazolidone compounds (Compound IV) from the 4-carboalkoxy-2-oxazoline compounds (Compound I).

The 4-carbohydroxyamido-2-oxazoline compound is prepared by reacting a 4-carboalkoxy-2-oxazoline compound having the general formula:

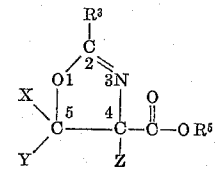

wherein X, Y, Z, $R^3$, and $R^5$ are as defined above, with a hydroxylamine in the presence of a base. Typical examples of such 4-carboalkoxy-2-oxazoline compounds are 2-phenyl-4-carbomethoxy-2-oxazoline; 2-phenyl-4-carbethoxy-2-oxazoline; 2-methyl-4-carbomethoxy-2-oxazoline; 2-methyl-4-carbethoxy-2-oxazoline; 2-phenyl-4-carbomethoxy-5-methyl-2-oxazoline; 2-phenyl-4-carbethoxy - 5 - methyl - 2 - oxazoline; 2 - phenyl - 4 - carbomethoxy-4-methyl-2-oxazoline; and 2-phenyl-4-carbethoxy-4-methyl-2-oxazoline. The hydroxylamine is of the general formula RNHOH wherein R is as defined above. Typical examples of suitable hydroxylamines are hydroxylamine, methyl hydroxylamine, ethyl hydroxylamine, propyl hydroxylamine, and benzyl hydroxylamine. The reaction is preferably carried out under anhydrous or substantially anhydrous conditions and in a solvent for the reactants. Suitable solvents are methanol, ethanol, propanol, butanol, dioxane or other similar solvents. The base is preferably an alkali metal alkoxide, such as sodium butoxide, potassium butoxide, sodium ethoxide, and sodium phenoxide but other bases may be used, such as potassium hydroxide, sodium hydroxide, lithium hydroxide and the like. The reaction temperature is not critical but it is preferred that it be at or below 30° C. and most preferably at about 0° to 15° C. The product may be precipitated by partially concentrating and acidfying the reaction mixture by the addition of a mineral acid. Examples of suitable acids are hydrochloric acid, hydrobromic acid, sulfuric acid and the like. Typical examples of 2-oxazoline-4-carbohydroxyamido compounds which may be produced are 2 - phenyl - 4 - carbohydroxamide - 2 - oxazoline; 2-methyl - 4 - carbohydroxamido - 2 - oxazoline; 2 - phenyl-4-carbohydroxamido-5-methyl-2-oxazoline; 2-phenyl-(N-methylcarbohydroxamido)-2-oxazoline.

The 4-carbohydroxyamido-2-oxazoline compound is reacted with an ionizable halide compound having the general formula $R^2Q$ wherein $R^2$ is as defined above. The ionizable halide is a compound wherein the halide atom has a molecular weight greater than 30, which includes a chloride, bromide and iodide. Typical examples of such compound are hydrogen chloride, methyl chloride, benzyl chloride, and ethyl chloride. The reaction is preferably carried out in an inert anhydrous solvent, such as an ether, or aromatic hydrocarbon. Typical examples of such solvents are benzene, toluene, dioxane, propyl ether, and methyl ethyl ether. The temperature of the reaction is preferably above 60° C. The mixture can be filtered hot to remove any insoluble material evaporated in vacuo to crystallize the product. The product may then be purified by dissolving in an alcohol, such isopropanol, propanol, butanol, or ethanol, preferably a hot alcohol, and then precipitated by the addition of a non-solvent, such as a low-boiling petroleum ether. Typical examples of the $\beta$-halopropionohydroxamic acid compound are $\alpha$-benzamido-$\beta$-chloropropionohydroxamic acid; $\alpha$-benzamido-$\beta$-bromopropionohydroxamic acid; $\alpha$-benzamido-$\beta$-iodopropionohydroxamic acid; $\alpha$-acetamido-$\beta$-chloropropionohydroxamic acid; $\alpha$-acetamido-$\beta$-bromopropionohydroxamic acid; $\alpha$-acetamido-$\beta$-iodopropionohydroxamic acid; $\alpha$-(N-benzylbenzamido)-$\beta$-bromopropionohydroxamic acid; $\alpha$-(N-benzylbenzamido)-$\beta$-iodopropionohydroxamic acid; $\alpha$-benzamido-$\beta$-chloro-N-methylpropionohydroxamic acid; $\alpha$-benzamido-$\beta$-bromo-N-methylpropionohydroxamic acid; $\alpha$-benzamido-$\beta$-iodo-N-methylpropionohydroxamic acid; $\alpha$-benzamido-$\beta$-chlorobutyrohydroxamic acid; $\alpha$-benzamido-$\beta$-bromobutyrohydroxamic acid; and $\alpha$-benzamido-$\beta$-iodobutyrohydroxamic acid.

The $\beta$-halopropionohydroxamic acid compound is treated with a base to cyclize the compound to form a 4-amido-3-isoxazolidone compound. The base is preferably a water-soluble base, such as one of the alkali metal hydroxides. Other bases may be used however, such as alkali metal alkoxides, such as sodium methoxide, potassium ethoxide, sodium ethoxide, or sodium propoxide. The reaction is preferably carried out in a solvent, such as any water-soluble alcohol or ether, as for example, ethanol, n-propanol, tetrahydrofuran or dioxane. The reaction proceeds most favorably at a temperature of about 20° C. to about 100° C. The product is isolated by the addition of a mineral acid, such as hydrochloric acid, hydrobromic acid, or sulfuric acid, and extraction into a water-immiscible solvent, as for example, chloroform, methylene chloride, benzene, or ether. The organic extract is then concentrated and allowed to cool with formation of the crystalline product. The 4-amido-3-isoxazolidone compound thus prepared has the general formula:

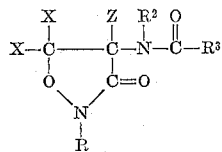

wherein X, Y, Z, R, $R^2$, and $R^3$ are as defined above. Typical examples of these compounds are 4-benzamido-3-isoxazolidone; 4-acetamido-3-isoxazolidone; 4-benzamido-5-methyl-3-isoxazolidone; 4-(N-benzylbenzamido)-3-isoxazolidone; and 2-methyl-4-benzamido-3-isoxazolidone.

The 4-amino-3-isoxazolidones are useful as bactericidal and/or bacteriostatic agents. They are also of value as growth promoting agents in animals. These compounds may also prove to be useful in topical application since they appear to have pronounced activity against a large number of both gram-positive and gram-negative bacteria. In this regard it should be noted that the DL form of 4-amino-3-isoxazolidone has shown about ten times the activity of the D isomer against *D. pneumoniae*.

The following examples are given for purposes of illustration:

EXAMPLE 1

*Serine ethyl ester hydrochloride*

Three hundred and fifty grams serine (3.33 moles) was placed in a 5 liter flask equipped with stirrer, thermometer, gas inlet tube, and a short air-cooled reflux condenser connected at its upper end with a water cooled down condenser. Three thousand five hundred cubic centimeters anhydrous ethanol was added, then hydrogen chloride gas was passed into the suspension until the solid had dissolved and the temperature reached 70° C. The addition of hydrogen chloride gas was then stopped, external heat was applied and the reaction mixture was distilled at such a rate that 500 cc. distillate was collected in one hour. Five hundred cubic centimeters fresh anhydrous ethanol was added and the distillation continued at the same rate for another hour. The reaction mixture was concentrated in vacuo to a stiff syrup, two liters of ether was added, then scratched and stirred until crystallization was complete. After cooling at 0° C. overnight the crystals were collected, washed four times with 200 cc. anhydrous ether and dried in vacuo at 50°–60° C. Yield 558 grams serine ethyl ester hydrochloride (99% of theory), melting point 94°–97° C.

EXAMPLE 2

*Benzimido ethyl ether*

In a five liter flask equipped with thermometer and gas inlet tube was placed 1248 grams (12.1 moles) benzonitrile and 605 grams (13.1 moles) absolute alcohol. The mixture was chilled to −10° C. and 515 grams (14.1 moles) hydrogen chloride gas was passed into the solution, allowing the temperature to go up to 25° C. The mixture was allowed to stand for 48 hours at room temperature cooling the first several hours as needed to keep the temperature below 30° C. The solid mass was transferred to an enamelled pail, one liter of ether was added, then a solution of 1500 grams potassium carbonate in three liters of water was cautiously added (pH 9). The organic layer was separated, washed with two times 500 cc. of water, dried over anhydrous sodium sulfate, filtered and washed with ether. The filtrate was made up to 5000 cc. with ether so that one liter contained 360 grams benzimido ether. The yield was practically quantitative.

EXAMPLE 3

*2-phenyl-4-carboethoxy-2-oxazoline*

One thousand six hundred and forty-four grams serine ethyl ester hydrochloride (9.7 moles) was dissolved in 970 cc. water in a ten liter Morton flask, 2160 grams benzimido ethyl ether (14.5 moles) in ether (total volume six liters) was added, then stirred vigorously and rapidly for 24 hours. About 1500 cc. water was added to dissolve the ammonium chloride, then allowed to settle for ten minutes. The aqueous layer and the heavy interphase emulsion were filtered and the filter cake was washed two times with 500 cc. of ether; the ether washes were separated from the new clear aqueous layer which was discarded. The combined organic layers were washed three times with 1500 cc. of water and dried over anhydrous magnesium sulfate. The ether was distilled off in vacuo, then the excess benzimido ethyl ether was recovered by distilling at one millimeter up to a head temperature of 100° C. (internal temperature 135° C.). Only a few drops came over at this point. Recovered 565 grams benzimidoethyl ether. The crude, undistilled 2-phenyl-4-carboethoxy-2-oxazoline weight 1834 grams (86.5% of theory).

A sample was distilled in vacuo; there was practically no forerun and practically no residue; nearly all distilled at 138°–141° C. per 0.6 millimeter (internal temperature 170°–175° C.). Calcd. for $C_{12}H_{13}O_3N$: C, 65.75; H, 5.98; N, 6.39. Found: C, 66.18; H, 5.98; N, 6.82. $n_D^{25}=1.5396$.

EXAMPLE 4

2-phenyl-4-carbohydroxamido-2-oxazoline

Hydroxylamine hydrochloride (152.8 grams, 2.2 moles) was dissolved in 3.2 liters hot anhydrous ethanol, a solution of 52 grams sodium in 1000 cc. anhydrous ethanol was added, then chilled to 0° C. The solution was filtered into a 12-liter flask and the sodium chloride washed twice with 25 cc. portion of cold anhydrous ethanol. A cold solution of 438 grams (two moles) crude 2-phenyl-4-carboethoxy-2-oxazoline in 880 cc. anhydrous ethanol was added over a period of ten to twenty minutes to the cold hydroxylamine solution, the combined alcohol solutions were chilled to 0° C., then a solution of 46 grams sodium in 1400 cc. anhydrous ethanol was added over a period of 45 minutes at 0°–2° C. with stirring. The mixture was stirred another two hours at 0°–5° C., then allowed to stand overnight at room temperature. The reaction mixture was concentrated in vacuo to a thick slurry which was dissolved in four liters of water, the turbid solution was treated with ten grams Darco, filtered and washed with 50 cc. water. The combined filtrate and washes were chilled to 5° C., then 1028 cc. 2.02 N hydrochloric acid (2.08 moles) was added over a period of 15 minutes at 5°–10° C. with stirring (pH about 7). The mixture was filtered at 5° C. the cake was washed seven times with 250 cc. of ice-water and air-dried at 50° C. until the moisture content was reduced to 0.2% or less. The average yield of four runs was 358 grams (88% of theory), melting point 176°–177° C. Analyzed as is: Calcd. for $C_{10}H_{10}O_3N_2$: C, 58.25; H, 4.89; N, 13.58. Found: C, 57.96; H, 4.98; N, 13.26.

A sample (60 grams) was dissolved in 3600 cc. of hot-methanol, treated with Darco (3 grams), filtered and chilled at 0° C. Yield 55.8 grams (93%), melting point 181°–182° C.

EXAMPLE 5

DL-4-benzamido-3-isoxazolidone

Two hundred and six grams crude 2-phenyl-4-carbohydroxamido-2-oxazoline (one mole) was placed in a ten liter Morton flask equipped with stirrer, thermometer and one liter dropping funnel, 2500 cc. dioxane was added followed by 2.5 cc. water, the suspension was heated to 95° C. with gentle stirring, then 1080 cc. dioxane containing 38.0 grams hydrogen chloride [1.04 mole, 0.035 gram hydrogen chloride per cc.] was added dropwise over a period of 100 minutes at 95°–98° C. with very rapid stirring. The mixture was stirred another 15 minutes at 95°–98° C. during which the reddish color changed to yellowish. The hot reaction mixture was sucked into a regular 5 liter flask and concentrated in vacuo to a crystalline mush of α-benzamido-β-chloropropionohydroxamic acid.

The residue was suspended in 2000 cc. water, warmed to 50° C. then 1060 cc. 1.98 N sodium hydroxide (84 grams sodium hydroxide, 2.1 moles) was added dropwise at 50°–55° C. over a period of 70 minutes with stirring. The solution was chilled in brine to 10° C., 700 cc. 2 N hydrochloric acid was added (pH about 2), then extracted as rapidly as possible twice with two liters followed by five times with one liter of ethyl acetate. The combined extracts were warmed to 40° C.–45° C. to dissolve some crystalline matter, dried over magnesium sulfate, treated with ten grams Darco and filtered. The clear filtrate was concentrated in vacuo to about 1.5 liter (crystals began to appear early during the concentration). The concentrate was chilled to 0° C. overnight, the solid was filtered, washed three times with 80 cc. ice-cold ethyl acetate and air-dried at 50° C. Yield 108 grams first crop, melting point 164°–167° C. The filtrate was concentrated to 250 cc., chilled at 0° C. overnight, filtered and washed three times with 20 cc. cold ethyl acetate; yield 20 grams second crop, melting point 159°–163° C. After concentrating to 150 cc. and cooling, etc., a third crop of two grams was isolated, melting point 160°–163° C. Total yield 130 grams crude DL-4-benzamido-3-isoxazolidone (63% of theory).

Five hundred and seventy grams crude product was treated with 25.6 liters hot ethyl acetate, suitably divided in 12 liter flasks, simmering the mixture on the steam bath for several minutes; the insoluble crystals (plates) exhibited a characteristic sheen. The hot mixture was allowed to cool to 55° C., then filtered at once. The insoluble material amounted to 50.6 grams (8.8%), melting point 160°–163° C. The filtrate was chilled at 0° C. overnight (crystallization does not commence until room temperature is approached). The cottony crystal mass was filtered off, washed twice with 750 cc. ice-cold ethyl acetate and air-dried at 40°–50° C. Yield 355 grams, melting point 170°–171° C.

The combined filtrate and washings were concentrated in vacuo to about 4.3 liters, chilled at 0° C. overnight, filtered, washed twice with 150 cc. of ice-cold ethyl acetate and dried. Yield 121 grams, melting point 171°–172° C. After concentrating in vacuo to 500 cc. chilling, etc., another crop of 16 grams crystals was obtained, melting point 168°–169° C. Total yield of satisfactory material 492 grams (86.3%). Calcd. for $C_{10}H_{10}O_3N$: C, 58.25; H, 4.89; N, 13.58. Found: C, 58.38; H, 5.30; N, 13.30.

EXAMPLE 6

2-phenyl-4-carbohydroxamido-2-oxazoline

To a cooled solution of 4 grams (0.0575 mole) of hydroxylamine hydrochloride in 100 milliliters of absolute ethanol was added 35 milliliters of 1.82 N sodium methoxide (0.636 mole) in ethanol. After cooling the mixture to 0° C. the sodium chloride was filtered off, and a solution of ten grams (0.0515 mole) of 2-phenyl-4-carbomethoxy-2-oxazoline in 20 milliliters of ethanol was added to the filtrate. This solution was cooled to 0° C. and 25 milliliters of 1.82 N sodium methoxide (.0455 mole) was added slowly. The reaction mixture was allowed to stand well stoppered overnight. The solution was concentrated in vacuo to about 75 milliliters volume at room temperature. When about 100 milliliters of water was added to the solution, rapid and exothermic crystallization of what was probably the sodium salt of the oxazoline hydroxamic acid occurred. Further addition of water caused the solid to redissolve. To this solution 43.3 milliliters of 1.16 N hydrochloric acid (51.5 moles) was added dropwise with simultaneous crystallization of the product occurring. The white platelets of 2-phenyl-4-carbohydroxamido-2-oxazoline were filtered and after drying in a vacuum desiccator weighed 8.02 grams (75.5% yield), melting point 174°–176° C. A recrystallized sample melted at 176°–179° C. decomposed. *Anal.*—Calcd.: C, 58.20; H, 4.88; N, 13.60. Found: C, 58.38; H, 5.05; N, 13.41.

EXAMPLE 7

α-Benzamido-β-chloropropionohydroxamic acid

To a mixture of 4 grams (.0194 mole) of 2-phenyl-4-carbohydroxamido-2-oxazoline and 50 milliliters of dry dioxane was added 44 milliliters of .46 N hydrogen chloride (0.0202 mole) in dry dioxane and the resulting mixture was heated on a steam bath for fifteen minutes (protected from moisture by a calcium chloride tube). During the heating period, the solution became pink and then colorless and the solid dissolved. The solution was filtered hot and evaporated in vacuo to a thick mass of crystals. These were dissolved in approximately 25 ml. of hot isopropanol and 175 ml. of low boiling petroleum ether was added slowly to the solution. Crystallization occurred readily and after standing two days at 5° C., the solid α-benzamido-β-chloropropionohydroxamic acid, 4.40 g., M. P. 148–152° C., was filtered. A second crop weighed 0.184 g., bringing the total yield to 93.5%. A small sample recrystallized from isopropanol-petroleum ether melted at 153–5° C. *Anal.*—Calcd.: C, 49.40; H, 4.56; N, 11.54; Cl, 14.6. Found: C, 48.94; H, 4.49; N, 11.77; Cl, 14.31.

EXAMPLE 8

*4-benzamido-3-isoxazolidone*

To a solution of 4.0 g. (0.0165 mole) of α-benzamido-β-chloropropionohydroxamic acid in about 30 ml. of hot methanol was added dropwise from a burette 31.5 ml. of 1.0 N sodium hydroxide (0.0315 mole). The solution was heated for a few minutes. It was then cooled, 4.2 ml. of 1.16 N hydrochloric acid (.0165 mole) was added, and the solution was immediately extracted with one 100-ml. portion and five 50-ml. portions of chloroform. The combined chloroform extracts were concentrated to about 200-ml. Crystallization began and after the mixture was cooled, 2.07 g. of 4-benzamido-3-isoxazolidone, M. P. 167–70° C. was collected on a filter. Another crop brought the crude yield to 2.54 g. (74.5%), and an analytical sample melted at 165–8° C. *Anal.*—Calcd.: C, 58.24; H, 4.89; N, 13.59. Found: C, 58.45; H, 4.70; N, 13.37.

EXAMPLE 9

*2-phenyl-4-carbohydroxamido-5-methyl-2-oxazoline*

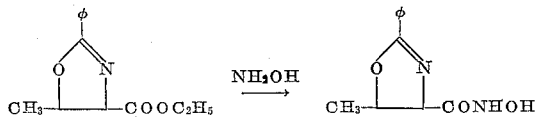

The procedure for the preparation of 2-phenyl-4-carbohydroxamido-5-methyl-2-oxazoline is the same as that described for the 2-phenyl-4-carbohydroxamido-2-oxazoline in Example 6. One hundred eighty-seven grams of oxazoline ester yielded one hundred forty-nine grams (79.2% yield) of the oxazoline hydroxamic acid, M. P. 152–4° C. A sample recrystallized from isopropanol melted at 148–150° C. *Anal.*—Calcd.: C, 59.99; H, 5.49; N, 12.73. Found: C, 59.98; H, 5.31; N, 12.91.

EXAMPLE 10

*α-Benzamido-β-chlorobutyrohydroxamic acid*

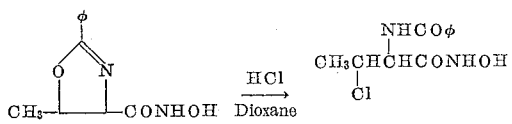

To a stirred refluxing solution of 9.6 g. (0.0435 mole) of 2-phenyl-4-carbohydroxamido-5-methyl-2-oxazoline in approximately 500 ml. of dry dioxane (distilled from sodium three times) was added dropwise over a period of one hour 120 ml. of dioxane containing 1.8 g. (0.0492 mole) of hydrogen chloride. During the addition of the hydrogen chloride solution, the reaction mixture became pink and a small quantity of a flocculent precipitate appeared. The solution was cooled, treated with Darco G–60 and filtered. The residue obtained from lyophilization of the filtrate was extracted with one 400-ml. and three 50-ml. portions of boiling ethyl acetate and the combined extracts diluted with an equal volume of chloroform. On cooling this solution, 6.58 g. (0.0256 mole, 58.8% yield) of α-benzamido-β-chlorobutyrohydroxamic acid, M. P. 139–143° C., was obtained. A sample recrystallized from chloroform melted at 141–142.5° C. The ethyl acetate insoluble portion of the residue was apparently unrearranged oxazoline hydrochloride. *Anal.*—Calcd.: C, 51.47; H, 5.10; N, 10.89; Cl, 13.81. Found: C, 51.72; H, 5.40; N, 10.94; Cl, 13.72.

EXAMPLE 11

*4-benzamido-5-methyl-3-isoxazolidone*

To a stirred slurry of 6.40 g. (0.025 moles) of α-benzamido-β-chlorobutyrohydroxamic acid in 100 ml. of water heated to 65–75° C. was added in one hour sufficient (46 ml., 183%) .99 N sodium hydroxide to give a permanent phenol phthalein end point. The solution was cooled in an ice bath and to it 21.4 ml. of 1.16 N (0.025 mole) hydrochloric acid was added. The acidic solution was extracted with five 250-ml. portions of chloroform and the combined dried extracts concentrated to approximately 225 ml. The crystalline precipitate, 3.32 g., M. P. 188–194° C. was collected on a filter. The filtrate on concentration yielded another 1.02 g., M. P. 187–192° C., bringing the total yield to 4.34 g. (79%). A small sample recrystallized from chloroform melted at 187–190° C.

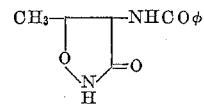

*Anal.*—Calcd.: C, 59.99; H, 5.49; N, 12.72. Found: C, 59.62; H, 5.14; N, 12.56.

Any departure from the above description which conforms to the present invention is intended to be included within the scope of the claims.

What is claimed is:

1. A process which comprises reacting a 4-carboalkoxy-2-oxazoline compound having the general formula

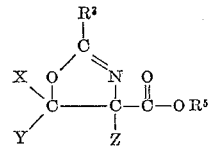

wherein X, Y and Z are selected from the class consisting of hydrogen and alkyl, aralkyl and aryl groups containing from one to eight carbon atoms and may be the same and different groups, $R^3$ is selected from the class consisting of alkyl, aralkyl and aryl groups containing from one to eight carbon atoms and $R^5$ is an alkyl group containing from one to eight carbon atoms, with a hydroxylamine compound in the presence of a base to produce the corresponding 4-carbohydroxamido-2-oxazoline compound.

2. The process of claim 1 wherein the hydroxylamine compound has the formula RNHOH wherein R is selected from the class consisting of hydrogen and alkyl, and aralkyl groups containing from one to eight carbon atoms.

3. The process of claim 1 wherein the hydroxylamine compound is hydroxylamine.

4. The process of claim 1 wherein the base is an alkali metal alkoxide.

5. The process of claim 1 wherein the reaction is carried out under substantially anhydrous conditions.

6. The process of claim 1 wherein the reaction is carried out at a temperature not higher than 30° C.

7. The process of claim 1 wherein the 4-carbohydroxamido-2-oxazoline compound is recovered by precipitating from the reaction mixture by the addition of a mineral acid.

8. The process of claim 2 wherein the 4-carboalkoxy-2-oxazoline is 2-phenyl-4-carbomethoxy-2-oxazoline.

9. The process of claim 2 wherein the reaction is carried out in a solvent for the reactants.

10. The process of claim 7 wherein the mineral acid is hydrochloric acid.

11. The process of claim 9 wherein the solvent is absolute alcohol.

12. A process which comprises reacting 2-phenyl-4-carbomethoxy-2-oxazoline with hydroxylamine in the presence of a base to produce 2-phenyl-4-carbohydroxamido-2-oxazoline.

13. The process of claim 12 wherein the base is an alkali metal alkoxide.

14. A process which comprises reacting 2-phenyl-4-carbomethoxy-2-oxazoline with hydroxylamine in absolute alcohol in the presence of an alkali metal alkoxide at a temperature of about 0 to 15° C. to produce 2-phenyl-4-carbohydroxamido-2-oxazoline.

15. A process which comprises reacting 2-phenyl-4-carbomethoxy-5-methyl-2-oxazoline with hydroxylamine in the presence of a base to produce 2-phenyl-4-carbohydroxamido-5-methyl-2-oxazoline.

16. The process of claim 15 wherein the base is an alkali metal alkoxide.

17. The process of claim 16 wherein the reaction is carried out in absolute alcohol at a temperature of about 0 to 15° C.

18. The process which comprises reacting a 4-carbohydroxamido-2-oxazoline compound having the general formula

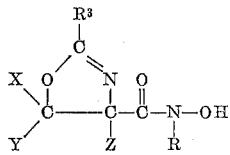

wherein X, Y and Z are selected from the class consisting of hydrogen and alkyl, aralkyl, and aryl groups containing from one to eight carbon atoms and may be the same or different groups, R is selected from the class consisting of hydrogen and alkyl and aralkyl groups containing from one to eight carbon atoms, and R³ is selected from the class consisting of alkyl, aryl and aralkyl groups containing from one to eight carbon atoms, with an ionizable halide having the general formula R²Q wherein R² is selected from the class consisting of hydrogen and alkyl and aralkyl groups containing from one to eight carbon atoms and Q is a halogen having an atomic weight greater than 30, to produce the corresponding β-halopropionohydroxamic acid compound.

19. The process of claim 18 wherein the ionizable halide is an acidic ionizable chloride.

20. The process of claim 18 wherein the acidic ionizable halide is hydrochloric acid.

21. The process of claim 18 wherein the reaction is carried out in a substantially anhydrous solvent for the reactants.

22. The process of claim 18 wherein the solvent is an ether.

23. The process of claim 18 wherein the reaction is carried out at a temperature above 60° C.

24. The process of claim 15 wherein the 4-carbohydroxamido-2-oxazoline compound is 2-phenyl-4-carbohydroxamido-2-oxazoline.

25. The process of claim 15 wherein the 4-carbohydroxamido-2-oxazoline compound is 2-phenyl-4-carbohydroxamido-5-methyl-2-oxazoline.

26. The process of claim 21 wherein the β-chloropropiono-hydroxamic acid compound is precipitated from the reaction mixture by concentrating the reaction mixture in vacuo.

27. A process which comprises reacting 2-phenyl-4-carbohydroxamido-2-oxazoline with hydrochloric acid to produce α-benzamido-β-chloropropionohydroxamic acid.

28. The process of claim 27 wherein the reaction is carried out in an ether solvent.

29. The process of claim 28 wherein the reaction is carried out at a temperature above 60° C.

30. A process which comprises reacting 2-phenyl-4-carbohydroxamido-5-methyl-2-oxazoline with hydrochloric acid to produce α-benzamido-β-chlorobutyrohydroxamic acid.

31. The process of claim 30 wherein the reaction is carried out at a temperature above 60° C.

32. The process of claim 31 wherein the reaction is carried out in an ether solvent.

33. A process which comprises reacting a β-halopropionohydroxamic acid compound having the general formula $$R^2-N-C-R^3$$
$$\begin{matrix} X & & O \\ \diagdown & | & \| \\ & C-C-C-N-OH \\ \diagup & | & | \\ Y & Q & Z & R \end{matrix}$$

wherein Q is a halogen having an atomic weight greater than 30, X, Y and Z are selected from the class consisting of hydrogen and alkyl, aralkyl, and aryl groups containing from one to eight carbon atoms and may be the same and different groups, R and R² are selected from the class consisting of hydrogen and alkyl and aralkyl groups containing from one to eight carbon atoms and may be the same or different groups and R³ is selected from the class consisting of alkyl, aryl, and aralkyl groups containing from one to eight carbon atoms, with a base to produce the corresponding 4-amido-3-isoxazolidone compound.

34. The process of claim 33 wherein the base is a water-soluble base.

35. The process of claim 33 wherein the base is a water-soluble alkali metal hydroxide.

36. The process of claim 33 wherein the reaction is carried out in a water-miscible solvent.

37. The process of claim 33 wherein the 4-amido-3-isoxazolidone is removed from the reaction mixture by the addition of a mineral acid and extraction of the resulting mixture with a solvent for the 4-amido-3-isoxazolidone compound.

38. The process of claim 36 wherein the reaction is carried out at a temperature of about 20° C. to about 100° C.

39. The process of claim 25 wherein the 4-amido-3-isoxazolidone is removed from the reaction mixture by the addition of a mineral acid and extraction of the resulting mixture with chloroform.

40. A process which comprises reacting α-benzamido-β-chloro-propionohydroxamic acid with a base to produce 4-benzamido-3-isoxazolidone.

41. The process of claim 40 wherein the base is a water-soluble alkali metal hydroxide.

42. The process of claim 40 wherein the reaction is carried out in a water-miscible solvent.

43. The process of claim 41 wherein the reaction is carried out at a temperature of about 20 to 100° C.

44. A process which comprises reacting α-benzamido-β-chlorobutyrohydroxamic acid with a base to produce 4-benzamido-5-methyl-3-isoxazolidone.

45. The process of claim 44 wherein the base is a water-soluble alkali metal hydroxide.

46. The process of claim 44 wherein the reaction is carried out at a temperature of about 20 to 100° C.

47. The process which comprises reacting a 4-carboalkoxy-2-oxazolidone compound having the general formula—

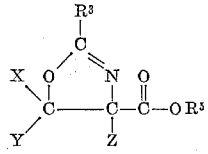

wherein X, Y and Z are selected from the class consisting of hydrogen and alkyl, aralkyl and aryl containing one to eight carbon atoms and may be the same and different groups, R³ is selected from the class consisting of alkyl, aryl, and aralkyl groups containing from one to eight carbon atoms, and R⁵ is a one to eight carbon atom alkyl group, with a hydroxylamine having the formula RNHOH wherein R is selected from the class consisting of hydrogen and alkyl, and aralkyl groups containing from one to eight carbon atoms, in the presence of a base to produce the corresponding 4-carbohydroxamido-2-oxazoline compound having the general formula—

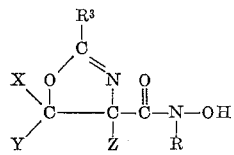

wherein X, Y, Z, R³ and R are as defined above, reacting this compound with an ionizable halide compound having the general formula R²Q wherein R² is selected from the class consisting of hydrogen and alkyl and aralkyl groups containing from one to eight carbon atoms and Q is a halogen having an atomic weight greater than 30, to produce a β - halopropionohydroxamic acid compound having the general formula—

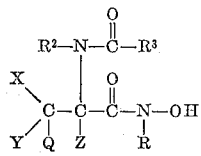

wherein Q, X, Y, Z, R, R² and R³ are as defined above, and reacting this latter compound with a water soluble base to produce the corresponding 4-amido-3-isoxazolidone compound.

48. The process which comprises reacting 2-phenyl-4-carbomethoxy - 2 - oxazoline with hydroxylamine in the presence of an alkali metal alkoxide to produce 2-phenyl-4-carbo-hydroxamido-2-oxazoline, reacting this compound with hydrochloric acid to produce α-benzamido-β-chloropropionohydroxamic acid, and treating the latter compound with an alkali metal hydroxide to produce 4-benzamido-3-isoxazolidone.

49. A process which comprises reacting 2-phenyl-4-carbethoxy-2-oxazoline with hydroxylamine in the presence of a sodium ethoxide to produce 2-phenyl-4-carbohydroxamido-2-oxazoline, reacting this compound with hydrochloric acid to produce α-benzamido-β-chloropropionohydroxamic acid, and treating the latter compound with an alkali metal hydroxide to produce 4-benzamido-3-isoxazolidone.

50. A process which comprises reacting 2-phenyl-4-carboethoxy-5-methyl-2-oxazoline with hydroxylamine in the presence of an alkali metal alkoxide to produce 2-phenyl-4-carbohydroxamido-5-methyl-2-oxazoline, reacting this compound with hydrochloric acid to produce α-benzamido-β-chlorobutyrohydroxamic acid and treating the latter compound with an alkali metal hydroxide to produce 4-benzamido-5-methyl-3-isoxazolidone.

51. Compounds having the general formula—

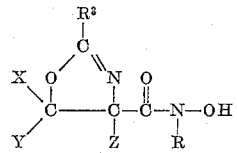

wherein X, Y and Z are selected from the group consisting of hydrogen, alkyl, aralkyl and aryl groups containing from one to eight carbon atoms and may be the same and different groups, and R and R³ are selected from the group consisting of hydrogen, alkyl and aralkyl groups containing from one to eight carbon atoms and may be the same and different groups.

52. Compounds having the general formula—

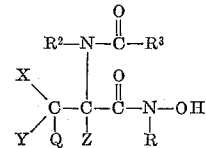

wherein Q is a halogen having an atomic weight greater than 30, X, Y, and Z are selected from the group consisting of hydrogen, alkyl, aralkyl and aryl groups containing from one to eight carbon atoms and may be the same and different groups, R and R² are selected from the group consisting of hydrogen, alkyl and aralkyl groups containing from one to eight carbon atoms, and may be the same and different, and R³ is selected from the group consisting of aryl, alkyl and aralkyl groups containing from one to eight carbon atoms.

53. α-Benzamido-β-chloropropionohydroxamic acid.
54. α-Benzamido-β-chlorobutyrohydroxamic acid.
55. 2-phenyl-4-carbohydroxamido-2-oxazoline.
56. 2 - phenyl - 4 - carbohydroxamido - 5 - methyl - 2-oxazoline.

References Cited in the file of this patent
FOREIGN PATENTS 715,362    Great Britain _____ Sept. 15, 1954

OTHER REFERENCES

Dunn et al.: Chem. Abst., vol. 44, col. 2533 (1950).
Johnston: J. Biol. Chem., vol. 185, pp. 629–41 (1950).